March 24, 1931. O. E. SCHOOLER 1,797,516
CLUTCH CONTROLLER
Filed Nov. 23, 1929
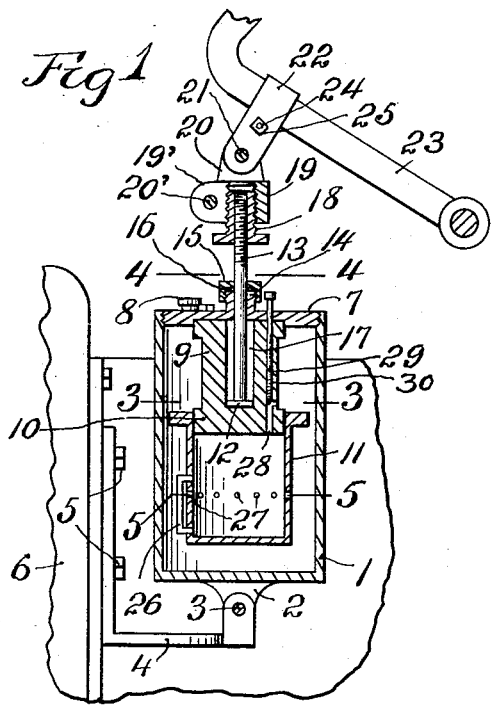
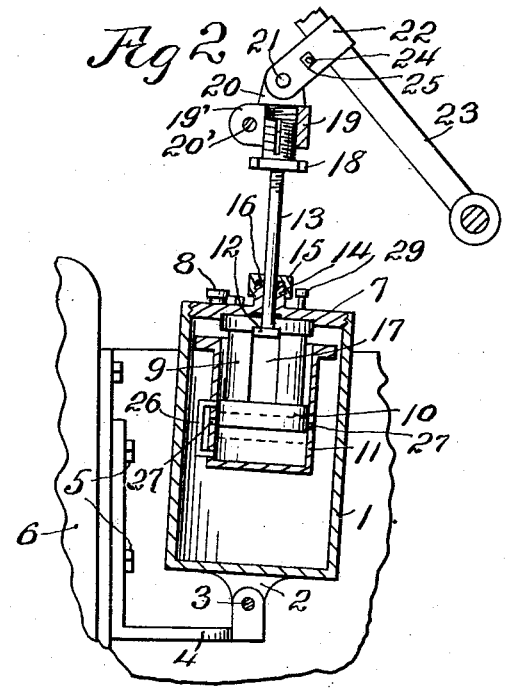
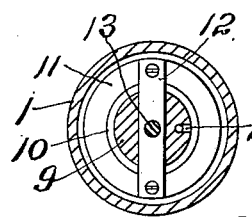
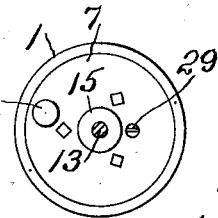
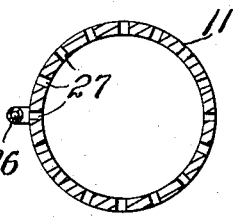
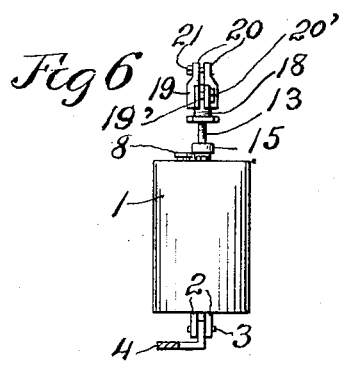
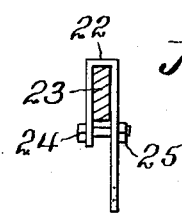
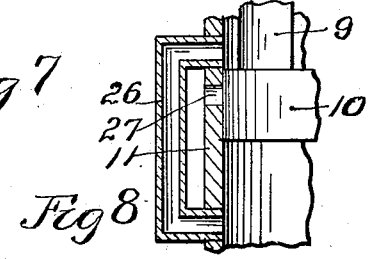

Patented Mar. 24, 1931

1,797,516

UNITED STATES PATENT OFFICE

ORIEN E. SCHOOLER, OF WEBB CITY, MISSOURI

CLUTCH CONTROLLER

Application filed November 23, 1929. Serial No. 409,328.

My invention relates to improvements in clutch controllers. It is particularly well adapted for use in connection with an operating clutch pedal of a clutch mechanism of an automobile.

One of the objects of my invention is to provide a novel clutch controller by means of which a too sudden engagement of the clutch members, upon the retraction of the clutch pedal, is prevented.

A further object of my invention is to provide a clutch controller of the kind described, which is simple, cheap, strong, durable, not likely to get out of order, which is automatic in its action, and which is readily adaptable to automobile clutch mechanisms of types in common use.

The novel features of my invention are hereinafter fully described and claimed.

In the accompanying drawing, which illustrates the preferred embodiment of my invention, Fig. 1 is a vertical sectional view of my improved clutch controller, shown mounted on an engine body and attached to a clutch pedal, which is partly broken away, and depressed.

Fig. 2 is a similar view, showing the clutch pedal and controller parts in the almost fully retracted positions.

Fig. 3 is a section, enlarged, on the line 3—3 of Fig. 1.

Fig. 4 is a section, enlarged, on the line 4—4 of Fig. 1.

Fig. 5 is a section, enlarged, on the line 5—5 of Fig. 1.

Fig. 6 is a reduced front elevation, partly broken away of my improved controller.

Fig. 7 is an enlarged cross section of the clutch pedal with the attaching clamp mounted thereon.

Fig. 8 is an enlarged vertical sectional view of a portion of the cylinder and its by-pass and a part of the piston.

Similar reference characters designate similar parts in the different views.

1 designates the body of a fluid containing receptacle, which, when in operative condition contains a liquid, such as oil, or some anti-freeze liquid, and which is provided with a closed bottom, having on its under side two ears 2 between which is pivoted by means of a horizontal pin 3, one end of a bracket 4, which is fastened by two bolts 5 to the fly wheel housing 6 of an automobile engine.

The receptacle 1 is provided with a removable peripherally threaded top 7 provided with a filling opening normally closed by a screw closure 8.

The under side of the top 7 has a circular recess, centrally disposed, and having fastened in it the upper end of a piston 9 having at its lower end a cylindrical head 10, on which is reciprocatively fitted a cylinder 11, having fastened across its upper end a horizontal bar 12 to the center of which is fastened the inner lower end of a rod 13, which extends through and is reciprocatively fitted in a central hole through the top 7.

The rod 13 extends through a central boss 14 on the top 7, which boss is externally threaded and has fitted on it a packing collar 15, which encircles the rod 13 and forces packing 16 against said boss and rod. The piston 9 has in it, extending from its upper end a slot 17 through which the bar 12 extends and is reciprocative vertically.

The upper outer end of the rod 13 is threaded and has fitted on it an internally threaded longitudinally slit sleeve 18, the outer periphery of which is threaded oppositely to the internal threading of the sleeve, said threaded periphery of said sleeve 18 being fitted in a threaded hole through a longitudinally split clamping member 19.

The member 19 has at opposite sides of its slit two ears 19' connected by a bolt 20' by which the member 19 is made to clamp the sleeve 18.

The clamping member 19 has at its upper end two ears 20 through which extends a horizontal bolt 21 on which is pivoted, between the ears 20, one arm of a U shaped clamp 22, which embraces a clutch operating oscillatory member, such as a pedal 23. A transverse bolt 24 extends through the arms of the clamp 22 and has on it a nut 25. By tightening the nut 25, the clamp 22 is made to firmly embrace the clutch pedal 23. The latter has the usual means for yieldingly forcing it to the retracted or clutch engaging position.

The cylinder 11 has its side wall provided with a by-pass comprising a U shaped tube 26, the arms of which extend through the side wall of the cylinder, the ends of the by-pass being disposed at different distances from the lower closed end of the cylinder 11, and the tube 26 being disposed at the outer side of the cylinder 11 within the receptacle 1.

The side wall of the cylinder 11 is provided therethrough with an annular row of passages 27 located between the ends of the by-pass tube 26.

When the pedal 23 moves upwardly on its retractile stroke from the depressed position, shown in Fig. 1, the cylinder 11 will be drawn upwardly on its retractile stroke, by means of the bar 12, rod 13, sleeve 18, clamping member 19 and clamp 22. When the pedal 23 is depressed, the cylinder, by the means just described, will be forced downwardly on the piston head 10.

The piston head 10 has extending upwardly through it a by-pass 28, the upper end of which turns laterally and extends to the periphery of the piston 9. For adjusting the flow of liquid through the by-pass 28, a needle valve 29 extends through a hole in the top 7 and is adjustably fitted in a threaded longitudinal hole 30 in the piston 9, and which intersects the by-pass 28 at the lateral turn of the latter.

The needle valve 29 can be adjusted so as to close more or less the by-pass 28.

After the pedal 23 has been depressed to the position shown in Fig. 1, to release the clutch, and the pedal is then permitted to retract, to throw in the clutch, the cylinder 11 will be moved upwardly by the retractile movement of the pedal, and when the clutch members are about to become drivingly engaged, the head 10 of the piston 9 will be in the position shown in solid lines in Fig. 2, in which position, the head 10 will cover and close the passages 27 and the upper end of the by-pass 26. Upon further upward movement of the cylinder 11, the liquid in the cylinder below the piston head 10, can only pass out of the cylinder through the by-pass 28, and the pedal will be held back in its retracting movement, due to the slow escape of the liquid through the by-pass 28, and the clutch can not grip suddenly, but will take hold gradually, although the foot is removed from the pedal 23. As soon as the cylinder 11 on its upward movement causes the upper end of the by-pass 26 to pass the upper side of the head 10, the liquid in the cylinder 11 under the piston head 10 can escape through the by-pass 26 into the receptacle 1 at the outer side of the cylinder 11, as well as through the by-pass 28. The pedal 23 will then be permitted to freely move to its fully retracted position, at which time, the by-pass 26 and cylinder 11 will be disposed with reference to the piston head 10, as shown in Fig. 8 and as shown in dotted lines in Fig. 2.

By adjusting the sleeve 18 on the rod 13 and in the clamping member 19, which can be done after loosening the bolt 20', the cylinder may be adjusted relative to the piston head 10, so as to have the latter cover the passages 27 and the upper end of the by-pass 26 at the proper time. The bolt 20' is then tightened to hold the member 19 clamped to the sleeve 18, and the latter clamped to the rod 13.

By having the pin 3, on which the receptacle 1 is pivoted, parallel with the axis of the pedal 23, as shown, the receptacle 1 can oscillate on the bracket 4 to suit the positions to which the pedal moves.

When the pedal 23 is depressed, liquid from the receptacle 1 enters the cylinder 11 below the piston head 10, first through the by-passes 26 and 28, and then through the by-pass 28 and the passages 27, after the piston head 10 passes above the by-pass 26.

By having the needle valve 29 extended outside the receptacle 1, all required adjustments may be made without disassembling of any of the parts.

I do not limit my invention to the structure shown and described, as many modifications, within the scope of the appended claims, may be made without departing from the spirit of my invention.

What I claim is:—

1. In a clutch controller, an anchored fluid containing receptacle, a cylinder in said receptacle having an open end and a closed end and having in its side wall a by-pass with its ends at different distances from said closed end, and having through said side wall a passage between the ends of said by-pass, means attached to said cylinder and adapted for attachment to an oscillatory clutch operating member for reciprocating said cylinder, and a piston in and fastened to said receptacle and having a head on which said cylinder is reciprocative and which, on the retractile stroke of said cylinder closes and then opens one end of said by-pass, and closes said passage while said end of said by-pass is closed, said piston having a by-pass communicating with said cylinder at the inner side of said head and with said receptacle at the outer side of said head.

2. In a clutch controller, an anchored closed fluid containing receptacle, a cylinder in said receptacle having an open end and a closed end and having in its side wall a by-pass, and having through its side wall a passage between the ends of said by-pass, a rod attached to said cylinder and reciprocative through one wall of said receptacle, means attached to said rod and adapted for attachment to an oscillatory clutch operating member for reciprocating said rod and said cylinder, and a piston in and fastened to said receptacle and having a head on which said cylinder is reciprocative and which, on the retractile stroke of said cylinder closes and then opens one end of said by-pass and closes said passage while said end of by-pass is closed, said piston having a by-pass communicating with said cylinder at one side of said head and with said receptacle at the other side of said head.

3. In a clutch controller, an anchored fluid containing closed receptacle, a cylinder in said receptacle having an open end and a closed end and having in its side wall a by-pass with its ends at different distances from said closed end, and having through its side wall a passage between the ends of said by-pass, adjustable longitudinally extensible means attached to said cylinder and adapted for attachment to an oscillatory clutch operating member for reciprocating said cylinder, and a piston in and fastened to said receptacle and having a head on which said cylinder is reciprocative and which, on the retractile stroke of said cylinder closes and then opens one end of said by-pass, and closes said passage while said end of said by-pass is closed, said piston having a by-pass communicating with said cylinder at one side of said head and with said receptacle at the other side of said head.

4. In a clutch controller, an anchored fluid containing receptacle, a cylinder in said receptacle having an open end and a closed end and having in its side wall a by-pass with its ends at different distances from said closed end, and having through its side wall a passage between the ends of said by-pass, means attached to said cylinder and adapted for attachment to an oscillatory clutch operating member for reciprocating said cylinder, a piston in and fastened to said receptacle on which said cylinder is reciprocatively fitted and which, on the retractile stroke of the piston closes one end of said by-pass, and closes said passage while said end of said by-pass is closed, said piston having a by-pass communicating with said cylinder and with said receptacle at the outside of said cylinder, and an adjustable valve arranged to more or less close the last named by-pass.

5. In a clutch controller, a fluid containing receptacle, a cylinder therein having an open end and a closed end and having in its side wall a by-pass with its ends at different distances from said closed end, and having through said side wall between the ends of said by-pass a passage, means adapted for attachment to an oscillatory clutch operating member for reciprocating said cylinder, and a piston having anchoring means and provided with a head on which said cylinder is reciprocative and which, on the retractile stroke of said cylinder closes and then opens one end of said by-pass, and closes said passage while said end of said by-pass is closed, said piston having a by-pass communicating with said cylinder at the inner side of said head and with said receptacle at the outer side of said head.

In testimony whereof I have signed my name to this specification.

ORIEN E. SCHOOLER.